May 16, 1944.　　　G. M. SOULE　　　2,349,119
INDEXING CHUCK
Filed May 24, 1943　　　2 Sheets-Sheet 1
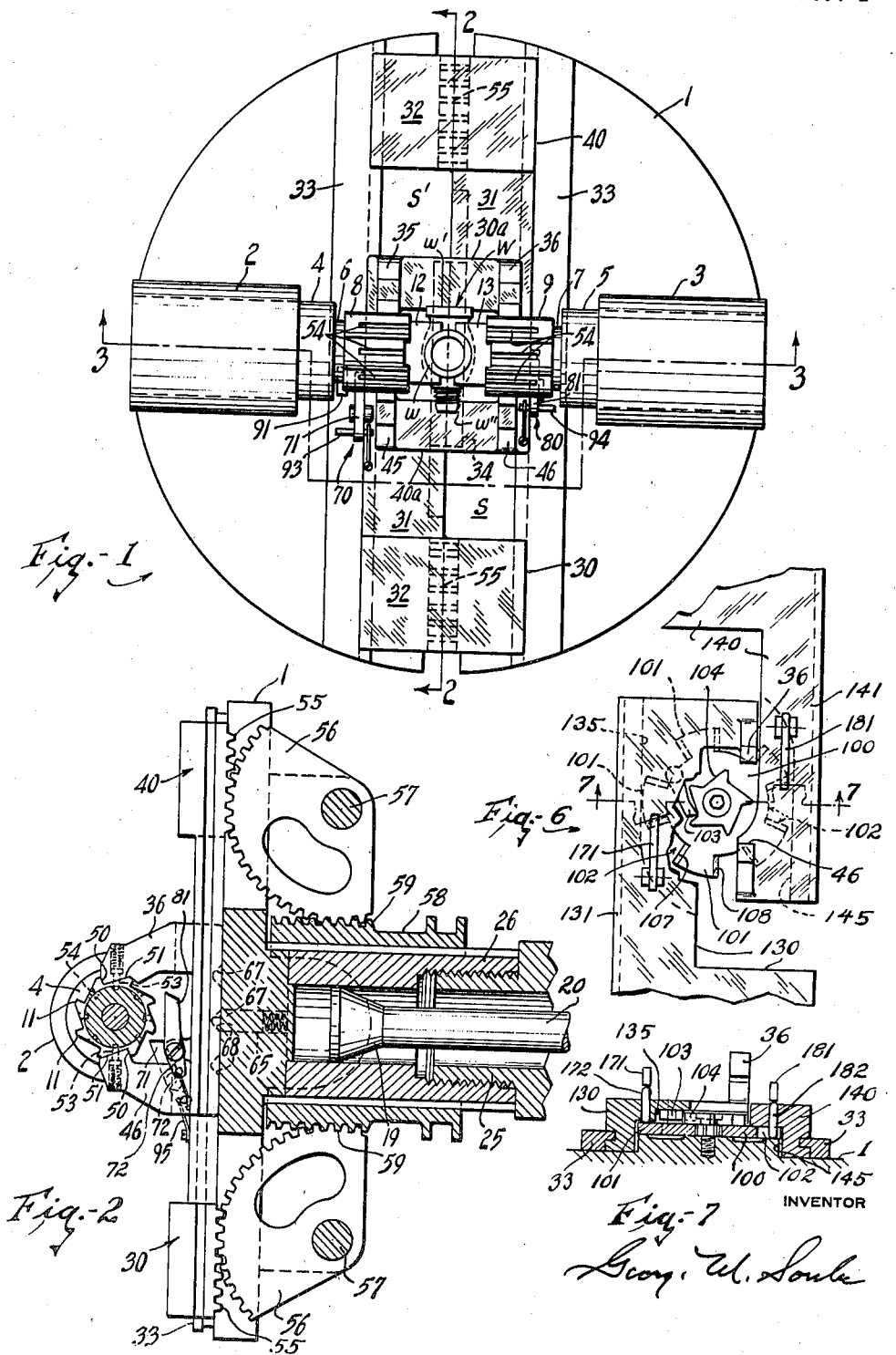
INVENTOR
George M. Soule

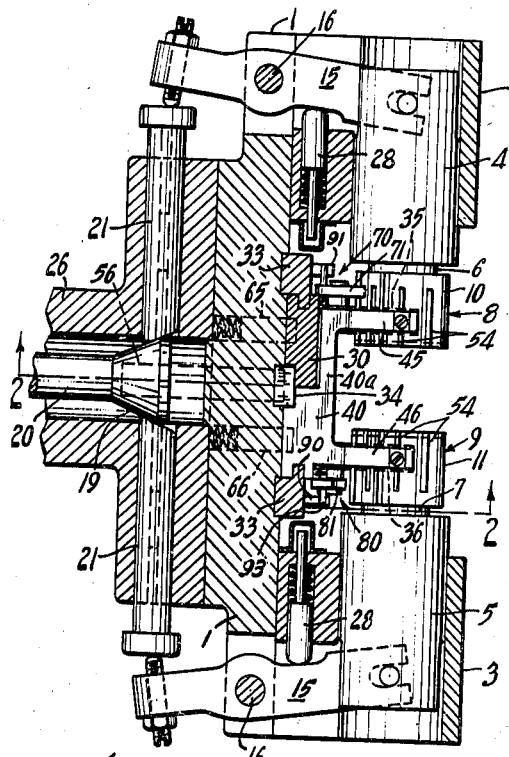

Patented May 16, 1944

2,349,119

UNITED STATES PATENT OFFICE 2,349,119

INDEXING CHUCK

George M. Soule, Medina, Ohio, assignor of one-half to The W. J. Schoenberger Company, Cleveland, Ohio, a corporation of Ohio, and one-half to Fred Hunziker, Cleveland, Ohio Application May 24, 1943, Serial No. 488,171

19 Claims. (Cl. 279—5)

This invention relates to a non-stop indexing chuck on the order of that shown in United States Patent No. 1,801,602, issued April 21, 1931, to Fred Hunziker.

One object hereof is to provide an indexing chuck in which dynamic balance for the chuck assembly under all conditions of operations is readily obtainable without the use of added weight, e. g. counterbalancing.

Another object is to provide an indexing chuck which is substantially fully symmetrical in construction on opposite sides of the axis of rotation of the chuck in all diametral planes.

A further object is to provide a novel and simplified means for releasably holding an indexing head assembly of a non-stop indexing chuck in indexed position.

A further object is to provide certain improvements in releasable locking or securing means for an indexable assembly on a rotating body such as that of a chuck, which means operates radially in opposite directions upon the assembly by substantially balanced application of centrifugal forces.

Other objects include the provision of various improvements, explained later herein, relating to indexing mechanism particularly for use in a non-stop indexing chuck, both for step by step indexing of work in a single direction and for reverse, or to and fro indexing.

In the drawings hereof, Fig. 1 is a front elevation of an indexing chuck embodying the present invention in one form; Fig. 2 is a longitudinal sectional view taken as indicated at 2—2 on Figs. 1 and 3; Fig. 3 is a generally central sectional view of the chuck taken substantially as indicated at 3—3 on Fig. 1; Fig. 4 is a relatively enlarged detail view similar to Fig. 2, but showing certain of the parts in a different relative position; Fig. 5 is a detail view corresponding to Fig. 2 showing a modified arrangement of work-supporting-head-gripping lugs; Fig. 6 is a diagrammatic front elevation of an arrangement, generally corresponding to Fig. 1, particularly for reverse indexing of work on successive cycles, and Fig. 7 is a sectional view taken generally as indicated at 7—7 on Fig. 6.

Referring further to the drawings, the main body member 1 of the chuck, as shown, is a circular plate or casting on which are mounted, as in diametrally opposite brackets 2 and 3, a pair of coaxial plungers 4 and 5 which support as on suitable antifriction bearings in the plungers indexable spindles 6 and 7. The spindles 6 and 7, on their mutually adjacent ends, carry respective indexable heads 8 and 9, which may be in the form of ratchet wheels each, in the particular form shown, having a set of eight equally spaced ratchet teeth 10 and 11, respectively. The heads 8 and 9 are suitably formed at their inner ends for demountably securing gripping jaws in fixed position thereon as at 12 and 13. The gripping jaws (shown only in Fig. 1), are releasably mounted on the respective heads 8 and 9 and are recessed on their mutually adjacent faces to grip work pieces therebetween such for example as the three arm T-shaped fitting W having arms or branches w, w' and w'' radiating from the center of the fitting. Said center lies on the rotational axis of the chuck generally and also on the indexing axis of the spindles 6 and 7.

The work gripping jaws can be moved in and out, to grip and release the work pieces, as by rocker arms 15 (Fig. 3) pivoted as at 16 on the main frame 1 and operated as by a single cone-shaped cam 19 on a slide bar 20 through push rods 21 which make operating contact with the rocker arms and with the cam as will be clear from Fig. 3 without more specific description. The gripper-jaw-operating arrangement is essentially the same as that shown and claimed in the prior application of Fred Hunziker, Serial No. 479,760, filed March 19, 1943. The slide bar 20 extends from suitable operating mechanism (e. g. fluid operated plunger, not shown) on the machine tool which carries the present indexing chuck as on the hollow spindle of said machine tool.

A portion of the spindle is shown at 25, Fig. 2, threaded into a generally cylindrical shank member or portion 26 of the chuck frame or body 1.

After the work piece W is gripped between the recessed jaws 12 and 13, by operation of the cam bar 20 and associated rocker arm mechanism, the spindles 6 and 7 can still turn easily in their bearing mounts on the plungers 4 and 5 notwithstanding a very considerable gripping pressure of the jaws on the work piece.

Spring plungers 28 are shown mounted in the brackets 2 and 3 for moving the plungers 4 and 5 outwardly away from the chuck center to spread the gripping jaws apart and release the work pieces.

After the work has been gripped by the above described or other suitable rotarily indexable gripping mechanism, the work is held against rotation on the frame 1, during performance of each cutting, threading or boring operation on the work, by oppositely acting slide members which move diametrally across the front face of the chuck frame (cf. Hunziker patent for a similar arrangement of one slide). Two parallel slides 30 and 40 are shown herein which, in construction, are very much alike and which can readily be made exactly equal in weight on opposite sides of the main longitudinal axis of the chuck. In the particular form shown, the main body of each slide 30 and 40 is generally L-shaped, as viewed in Fig. 1, each having an "arm" portion 31 and a "leg" portion 32, said arm portions lying mutually adjacent each other along a diametral central plane of the chuck and the leg portions being turned relatively oppositely about the main chuck center transversely of said plane. Thus the two slides can be secured to the chuck frame and supported for radially opposite movement thereon by a single pair of side guiding flanged rails 33 of conventional form fixed to the main body or frame 1 by suitable means not shown. A short central guide rail may also be provided as at 34 on the main frame between the adjacent arm portions 31 of the slides. While the slides operate in the same plane their movement for indexing purposes is enabled by spacing apart of the leg and arm portions of the two slides as at S and S', Fig. 1, twice the distance the slides are desired to move.

Each of the slides 30 and 40 has one or more index head positioning lugs which, in the relatively outwardly moved positions of the slides (30 downward and 40 upward as shown in Figs. 1, 2, 4 and 5), make retaining, precisionizing or locking contact with the unitary rotarily indexable work mounting assembly constituted by the two spindles 6 and 7 and the parts mounted thereon. The lugs are shown in pairs at 35, 45 for one indexing head and 36, 46 for the other. The lugs 35 and 36 are carried by the slide 30 and the lugs 45 and 46 by the slide 40, which arrangement enables the slide construction to be fully balanced, statically and dynamically, about the rotational axis of the chuck although only two oppositely acting lugs, one for each slide, would actually be necessary for accurately locating the work during operations performed thereon. The lugs, in event of using only two, could cooperate respectively with the heads 8 and 9; or both such lugs could act on one only of said heads, which would be the preferred arrangement in that case; compare Fig. 6, showing such single pair of lugs 36 and 46.

The lugs in order to make holding or locking contact with the work mounting assembly can, in event of using conventional ratchet tooth formations on the head members 8 and 9, each make contact with two relatively divergent tooth faces, as, for example, the radial faces 50 and sloping faces 51 of the engaged ratchet teeth.

Special head faces can be provided on one or both work clamping jaw mountings, as partially shown in Fig. 5, wherein the jaws 38 and 48 have parallel mutually adjacent faces at 39 and 49 for centrifugally operated gripping of opposite faces of a nearly square block 60 (shown larger than necessary for illustrative emphasis) and, additionally, slightly angularly disposed but nearly parallel faces 62 for wedgingly engaging and buttressing complementary surfaces 63 of the block 60 near the corner regions thereof. Such positive buttressing engagement of the positioning block (or blocks) 60, as by the lug surfaces 62 in a direction toward the indexing axis is important in order to reduce the bending moment on the work mounting assembly as a whole between the rigid supporting brackets 2 and 3 of the plungers 4 and 5 while work is being done on the piece W. (Compare Hunziker application in which the same general idea is brought out.) The blocks 60 in case two are used, one being sufficient, however, would be disposed axially adjacent respective ratchet wheel formations of the clamping-jaw-supporting spindles 6 and 7.

Referring further to the ratchet wheel forms of heads 8 and 9, Figs. 1 to 4, the lugs 35, 45, etc. (or one pair of them) can have additional precisionizing means thereon—shown in Figs. 2 and 4, in the form of spring pressed locking pins 53 with short, slightly converging nose portions adapted to seat wedgingly but yieldingly into complementary sockets in the associated head (or heads) 8 and/or 9. The sockets would ordinarily be constituted by grooves as at 54 formed parallel to the indexing axis of the head or heads 8 and/or 9 so that the work mounting assemblies or one of said assemblies can have various final operating positions lengthwise of the indexing axis as required for large and small pieces of work. The heads 8 and 9 are made longer than would ordinarily be necessary in an axial direction for the same reason, as more fully explained in the Hunziker patent—that is to say: so that the lugs 35, 45, etc. and the indexing means, to be described below, can operate properly notwithstanding variations in the work gripping relative positions of the plungers 4 and 5.

It will be observed in Figs. 1 and 3 that the lugs 36 and 45 are carried on portions 30a and 40a of the respective L-shaped slides 30 and 40 which portions extend laterally from the associated relatively adjacent or side-by-side "arm" slide portions, across each other. Only one such crossing-over portion (e. g. 40a) would be necessary in event one pair of jaws (35 and 45 for example) is used for engagement with the work mounting assembly—as for engagement with the head 8.

For operating the slides 30 and 40, each has, beneath the respective "leg" or weight affording portion 32 thereof, centrally disposed rack teeth 55 continually meshing with teeth of respective identical pinions or gear sectors 56 journalled as at 57 on the rear side of the main frame 1. The gear sectors are operated by a slidable sleeve 58 keyed to the main body shank 26 (Fig. 2) and having forwardly extending parallel toothed racks 59 in constant mesh with the respective gear sectors 56. The gearing, being duplex, is fully balanced about the main chuck axis in all operating positions. The sleeve 58 is operated, for example manually, by a shifting collar and yoke arrangement of conventional form or such as shown in said Hunziker application.

Spring pressed, cam detents 65 and 66, respective to the sides 30 and 40, may be provided on the main frame 1 for releasably holding the slides in their "in" and "out" positions against accidental or unintended dislocation. While the weight of the slides acted on by centrifugal force tends always to move the lugs 35, 45, etc. toward the indexable work mounting assembly, it is ordinarily unnecessary to provide means for preventing the slides from such movement while the work gripping jaws are separated, because at such times the chuck is not ordinarily rotated. The plungers 65 and 66 may seat in pairs of beveled notches 67 and 68 (Fig. 2) on the concealed faces of the slides.

The indexing means comprises, as shown, spring biased pawl mechanisms of more or less conventional form, as indicated generally at 70 and 80, respectively (see Fig. 1), pivotally carried on the respective slides 30 and 40 in a suitable manner. One of the pawls of said pawl mechanisms (81, pivoted at 82) operates the index the work gripping assembly while the slides are moving outwardly; and the other pawl (71, pivoted at 72) so operates while the slides are moving inwardly. Each pawl is idle during the operating stroke of the other; and the indexing operations are timed to take place successively just after the lugs 35, 45, etc. release the indexable heads (or head) and to terminate just before the lugs re-engage the heads (or head). With the arrangement just described the ratchet-wheel-shaped heads 8 and 9 would be so positioned that the ratchet teeth are mutually aligned along the indexing axis. The ratchet wheels could be adjustably positionable into and out of registration on the spindles and relative to the work clamping jaws or relatively reversed if desired or found necessary for timing or other purposes. The mountings for the pawls may also be adjustable along the respective slides (see, for example, the adjustable mounting 64 of the pawl 81 in Fig. 5) to facilitate original precision adjustment if desired, so that each pawl performs exactly a 45° indexing operation or such other angular indexing operation as demanded by the number of branches w, w' etc. on the work piece. For a three armed piece (Y fitting with branches 120° apart) the ratchet wheels would have six equally spaced teeth and the indexing would be through 60° per step by appropriate positioning of the leading ends of the pawls relative to the respective slides.

Since the lugs 35, 45 etc. desirably grip the ratchet wheel heads 8 and 9 (or special portions of the work mounting assembly as, for example, blocks such as 69, Fig. 5) at relatively angularly disposed faces, it is necessary that the pawl 81, which indexes the work mounting assembly consequent upon inward movement of the lugs toward said assembly shall perform its indexing operations during part of the inward movement of the lugs (toward said assembly) and then be caused to disengage the ratchet teeth during a subsequent portion of the inward movement so that the work mounting assembly will cease to be turned before the lugs make contact with such angularly disposed faces or before positioning members such as 53 engage the sockets such as 54. Such operation may be accomplished by the provision of a fixed cam 90 positioned for example on the guide rail 33 shown at the right in Fig. 1 (compare cam 90a Fig. 5) for coaction with the pawl 81 to move that pawl to inactive position before the lugs 35, 45, etc. engage the work mounting assembly. It is also desirable in some cases that the other pawl 71 be swung out of operating relationship with its associated ratchet wheel when the lugs 35, 45 etc. are moved away from the work mounting assembly. The operation just referred to is particularly advisable in an arrangement such as shown by Fig. 5 wherein it will be apparent that if the pawl 71 is not moved to retracted position when the lugs 38 and 48 are in a non-gripping position then the work releasing or gripping movement of the associated plunger 4 or 5 could cause the associated block 69 to damage the pawl 71 if in overhanging relation to the latter axially of the plungers 4 and 5.

As shown in Figs. 1 to 4, cross pins 93 and 94 of the respective pawls 71 and 81, which pins normally rest on the slide portions 31 to limit the movement of the pawls away from the main frame 1, are extended in opposite directions away from the slide mechanism generally into overhanging relation to the respective guide rails 33. The cams 90 and 91 for swinging the pawls out of operative alignment with teeth of the ratchet wheels may be mounted on the respective rails 33 in operative alignment with the cross pins. The cam 90 engages the cross pin 94 of the pawl 81 and moves it out of contact with the ratchet teeth of the head 9 on the stroke of the slide 40 which brings the lugs 45 and 46 toward the work mounting assembly, just before said lugs and the others make contact with the heads 8 and 9. Fig. 2 shows the pawl 81 in the released position as it would be moved by the cam 90. The cam 91 engages the cross pin 93 of the pawl 71 during the last portion of the outward movement of the lug-carrying portions of the two slides to swing the pawl 71 substantially into the position shown by Fig. 4 clear of the head 8 (or mechanism such for example as a positioning block 69, Fig. 5). Springs 95 carried by the respective slides 30 and 40 overlie the mutually adjacent or inwardly projecting ends of the cross pins 93 and 94 to return the pawls to active position after operation of the cams 90 and 91 as will be apparent.

The operation of the cam 90b, Fig. 5, is to swing the pawl 81 toward the main frame 1 when the lugs 38 and 48 are moved to the limit of their outward movement (position not shown) away from the block 60. The pawl 71 of Fig. 5 would have a cam corresponding to cam 90a for swinging the pawl 71 clear of the associated block 69 when the lugs 38 and 48 are moved relatively apart to release the indexable work mounting assembly.

The mechanism hereof can be modified so that the indexable work mounting assembly would be turned to and fro on successive cycles of operation of the slide and ratchet mechanism as would be desirable for instance in the machining of work pieces having only two relatively divergent branches to be worked on alternately by tools of a turret lathe, as exemplified by a pipe L. Such operation is generally taught by said Hunziker patent, see Fig. 17 thereof and accompanying description.

One arrangement as diagrammatically illustrated in Figs. 6 and 7 hereof for accomplishing such to and fro indexing movement in a double slide mechanism would include relatively reversing the ratchet wheels corresponding to the heads 8 and 9 and also their driving pawls so that one pawl and ratchet mechanism accomplishes a clockwise, e. g. 90°, indexing of the work mounting assembly on one cycle of operation of the slide mechanism and the other pawl and ratchet mechanism a counterclockwise, e. g. 90°, indexing on said work gripping assembly on the next cycle.

A suitable camming mechanism for rendering the work indexing pawls active alternately upon successive complete cycles of operation of the slides in and out is shown more or less diagrammatically in Figs. 6 and 7 comprising a generally circular disc-like cam 100 mounted for indexing rotation on and centrally of the frame 1 in a plane parallel to the principal planes of the slides. The cam 100 can be located for example in suitable recesses 135 and 145 underneath the two slides, see Fig. 7. The slides are shown in somewhat modified form at 130 and 140, the parallel "arm" portions 131 of the slides being shown spaced apart for greater clearness of illustration. The can 100 has an uneven number of camming lobes 101 and a corresponding number of recesses 102, for instance five equally spaced about the center of rotation of the cam, and a ratchet pawl 103 is shown as carried on the slide 130 on the concealed face thereof and arranged to coact with a five tooth ratchet wheel 104 concentrically of the cam 100 and rigid therewith. It is assumed that the pawl 103 turns the cam one fifth of a revolution during movement of the slide 130 downwardly as shown in Fig. 6. The arrangement enables the cam 100 to be turned only between indexing operations of the work indexing pawls 171 and 181 which are assumed to be generally similar to the pawls 71 and 81 of Fig. 4 but with springs tending to move the pawls to inactive positions. Said indexing pawls 171 and 181 perform their 90° indexing operation during outward movement of the lugs 36 and 46 away from the work mounting assembly (not shown) and the cam 100 is indexed from one position to another during movement of such positioning lugs toward the work mounting assembly. Thus with an arrangement such as shown, or one operating on essentially similar principles, a lobe 101 having suitable oppositely beveled cam portions 107 and 108 would be positioned in actuating relation to the pawl 171 on its indexing stroke for one cycle of operation of the slides 130 and 140 but, upon the occurrence of the next cycle, an adjacent recess 102 would be presented in operative association with the pawl 171 and permit that pawl to move into inactive position with respect to its ratchet wheel on the work mounting assembly. As suggested in Fig. 7, the pawls 171 and 181 could be alternately moved into and out of operating position as by axially rigid or resilient push rods 172 and 182 one end of each of which makes operative cam-following contact with the beveled and intermediate flat surfaces of the cam lobes 101 as presented thereto by movement of the associated slide and the other end with a respective pawl. For a 90° indexing movement of the work mounting assembly the cam lobes would probably require greater arcuate extent than as diagrammatically illustrated.

With the exception of the operation and arrangement of parts and assemblies herein specifically described as different, the mechanism hereof operates as do the non-stop indexing chuck mechanisms of Hunziker Patent 1,801,602 and said Hunziker application and for the same general purposes as served by said mechanism.

I claim:

1. An indexing chuck comprising a rotary head provided with work supporting means indexable on an axis extending at right angles to the rotational axis of the head, and two parallel slides movable simultaneously relatively outwardly and inwardly across one main face of the head one being arranged to index the work supporting means and to lock the same against rotation after indexing.

2. An indexing chuck comprising a rotary head provided with work supporting means indexable on an axis extending at right angles to the rotational axis of the head, and two parallel work indexing and locking members movable simultaneously relatively outwardly away from said axis and simultaneously relatively inwardly toward said axis.

3. An indexing chuck comprising a rotary head provided with indexable work supporting means turnable on an axis extending at right angles to the rotational axis of the head, two elongated slide members of similar proportions mounted side by side on the head generally centrally thereof and extending transverse to the axis of the work supporting means, means operatable during rotation of the head and operatively connected to the slide members in a manner to move them always in opposite directions whereby to maintain the chuck in approximate balance at all times, and indexing means for the work supporting means on one of the slide members.

4. An indexing chuck comprising a rotary head provided with work supporting means indexable on an axis extending at right angles to the rotational axis of the head, and two work indexing slides movable simultaneously relatively outwardly across one main face of the head, one slide operating during outward movement to index the work supporting means and the other operating upon movement inwardly to lock or clamp said means against turning about the indexing axis.

5. An indexing chuck having an indexable work support enabling different portions of a work piece to be presented at different times coaxially of the chuck, and work positioning means movable simultaneously in opposite directions generally diametrally of the chuck, characterized in that said means includes two mutually parallel slidably guided members which have their principal masses disposed on opposite sides of said axis in the direction of movement of said members.

6. An indexing chuck having an indexable work support enabling different portions of a work piece to be presented at different times coaxially of the chuck, and indexing slide means movable at right angles to the rotational axis of the chuck for performing indexing operations on the work support, characterized in that the slide means comprises a plurality of slide members which extend transversely of the chuck generally centrally thereof and move oppositely of each other, out and in, during the indexing operation.

7. An indexing chuck having an indexable work support enabling different portions of a work piece to be presented at different times coaxially of the chuck, and indexing slide means movable at right angles to the rotational axis of the chuck for performing indexing operations on the work support, characterized in that the slide means comprises two mutually parallel members which extend transversely of the chuck generally centrally thereof and move oppositely of each other to perform the indexing operations so as substantially to counterbalance each other at all times.

8. An indexing chuck having an indexable work support on its front face enabling different portions of a work piece to be presented at different times coaxially of the chuck, and indexing ratchet means movable across the front face of the chuck for performing indexing operations on the work support, characterized in that the ratchet means includes two mutually parallel, pawl carrying members which extend transversely of the chuck generally centrally thereof and move oppositely of each other during the indexing operations so as substantially to counterbalance each other at all times.

9. An indexing chuck comprising a rotary head, two slides extending parallel to each other and generally centrally of the head transverse to its axis of rotation, means arranged to reciprocate the slides by simultaneous movement in opposite directions, a rotarily indexable work supporting means on the head with its axis extending generally crosswise of the slides, cooperating indexing means on respective slides and acting during sliding movement thereof on the work supporting means to index the work, and means on the respective slides acting on the work supporting means to hold the same against indexing movement.

10. An indexing chuck comprising a rotary head, two slides extending parallel to each other and transversely of the head, means arranged to move the slides simultaneously in opposite radial directions, a rotarily indexable work supporting means including ratchet wheel means on the head with its axis extending generally crosswise of the slides, cooperating indexing pawl means on respective slides and acting during sliding movement thereof on the ratchet wheel means to index the work, and lugs on the slides acting on mutually adjacent tooth faces of the ratchet wheel means to hold the work against indexing movement.

11. An indexing chuck comprising a rotary head, two slides extending parallel to each other and transversely of the head, means arranged to move the slides simultaneously in opposite radial directions, a rotarily indexable work supporting means on the head with its axis extending generally crosswise of the slides, cooperating indexing means acting on the work supporting means to index the work, and resiliently mounted precisionizing plungers on respective slides acting in complementary radially disposed sockets in the work supporting means to hold the work against indexing movement.

12. An indexing chuck comprising a rotary head, two oppositely centrifugally biased slides extending parallel to each other and transversely of the head, means arranged to move the slides inwardly against the centrifugal force while the head is rotated, a rotarily indexable work supporting means on the head with its axis extending generally crosswise of the slides, indexing means on the head acting on the work supporting means to index the work, lugs on the slides acting oppositely on parallel faces of the work supporting means to hold the work against indexing movement when the slides are acted upon centrifugally as aforesaid, and means rigid with the lugs and cooperating wedgingly with other faces of the work supporting means to lock the same positively against indexing movement.

13. An indexing chuck comprising a rotary head, two slides extending parallel to each other and transversely of the head axis, means arranged to move the slides simultaneously in opposite directions, a rotarily indexable work supporting means on the head with its axis extending generally crosswise of the slides, indexing means on one of the slides and acting during sliding movement thereof on the work supporting means to index the work, and means on the other slide acting subsequently on the work supporting means to hold the same against indexing movement.

14. An indexing chuck comprising a rotatable chuck head, an indexable work support carried on aligned spindles respectively supported on the head at opposite sides of the rotational axis of the head for enabling different portions of a work piece clamped between the spindles to be presented at different times coaxially of the chuck head, indexing mechanisms movable in opposite directions transversely of the chuck axis and coacting with shoulders on respective spindles to index the work through respective partial indexing turns, and means coacting with shoulders spaced from the aforesaid shoulders axially of the spindles and movable with respective indexing mechanisms to hold the spindles against turning on their axes.

15. In an indexing chuck, an indexable work mounting, reversely acting ratchet mechanisms operable respectively on the mounting to turn it clockwise and counterclockwise, reciprocating slide means to operate the ratchet mechanisms, and means for rendering the ratchet mechanisms operative respectively on alternate reciprocations of the slide means.

16. An indexing chuck comprising an indexable work mounting, two slides operatively arranged to be reciprocated in relatively opposite directions and having means engaging and disengaging the mounting on opposite sides thereof, a pair of reversely positioned ratchet pawls, one on each of the slides, corresponding ratchet wheels on the mounting engaged by the pawls, and a cam indexed by one of the slides and operatively connected with the pawls to render them alternately active and inactive on successive reciprocations of the slides.

17. The arrangement according to claim 16 wherein the cam is rotatably mounted on a fixed axis relative to the slides and has an odd number of camming portions arranged for alternate operating association with the pawls.

18. In an indexing chuck, a work supporting spindle assembly having oppositely disposed bearing supports enabling indexing motion of the assembly on an axis transverse to the main rotational axis of the chuck, a pair of slides mounted on the chuck transverse to the indexing axis and generally centrally of the chuck, indexing means on one of the slides arranged to turn said assembly step by step during reciprocation of said slide, and slide reciprocating mechanism operable to move the slides simultaneously in opposite directions.

19. In an indexing chuck, a work supporting spindle assembly disposed for indexing movement on an axis transverse to the axis of rotation of the chuck, a pair of mutually balancing slides mounted for relative reciprocating movement across the face of the chuck and transverse to the indexing axis of the support, indexing mechanism on one of the slides cooperating with indexing mechanism on the work supporting assembly for step by step indexing movement of the latter, and mechanism on the chuck operatable during rotation thereof and arranged to move the slides always in opposite directions so that they tend to maintain balance of the chuck during and between indexing operations.

GEORGE M. SOULE.